US008548614B2

(12) United States Patent
Kirkeby et al.

(10) Patent No.: US 8,548,614 B2
(45) **Date of Patent: *Oct. 1, 2013**

(54) DYNAMIC RANGE CONTROL AND EQUALIZATION OF DIGITAL AUDIO USING WARPED PROCESSING

(75) Inventors: Ole Kirkeby, Espoo (FI); Jarmo Hiipakka, Espoo (FI)

(73) Assignee: Nokia Corporation, Espoo (FI)

( * ) Notice: Subject to any disclaimer, the term of this patent is extended or adjusted under 35 U.S.C. 154(b) by 297 days.

This patent is subject to a terminal disclaimer.

(21) Appl. No.: 12/459,138

(22) Filed: Jun. 25, 2009

(65) Prior Publication Data

US 2010/0010651 A1 Jan. 14, 2010

Related U.S. Application Data

(63) Continuation of application No. 10/830,715, filed on Apr. 23, 2004, now Pat. No. 7,587,254.

(51) Int. Cl.

| | |
|---|---|
| ***G06F 17/00*** | (2006.01) |
| ***H03G 9/00*** | (2006.01) |
| ***H03G 3/00*** | (2006.01) |
| ***G10L 19/00*** | (2013.01) |

(52) U.S. Cl.
USPC .............. 700/94; 381/102; 381/107; 704/502

(58) Field of Classification Search
USPC .................... 700/94; 381/102, 107; 704/502
See application file for complete search history.

(56) References Cited

U.S. PATENT DOCUMENTS 5,436,940 A * 7/1995 Nguyen ........................ 375/240
5,892,833 A 4/1999 Maag et al.
7,110,953 B1 * 9/2006 Edler et al. ................. 704/200.1
7,277,554 B2 * 10/2007 Kates ............................ 381/316
7,287,050 B2 * 10/2007 Christoph ..................... 708/320
7,305,100 B2 * 12/2007 Pedersen ....................... 381/320

FOREIGN PATENT DOCUMENTS

WO 03/015468 2/2003
WO 2004/079901 9/2004

OTHER PUBLICATIONS

Evangelista et al., "Frequency-Warped Filter Banks and Wavelet Transforms: A Discrete-Time Approach via Laguerre Expansion", Oct. 1998, IEEE Transactions on Signal Processing, vol. 46, No. 10, pp. 2638-2650.*

European Office Action mailed Feb. 24, 2010 in corresponding European Patent Application No. 05740396.6 (4 pages).

(Continued)

*Primary Examiner* — Davetta W Goins
*Assistant Examiner* — Daniel Sellers
(74) *Attorney, Agent, or Firm* — Alston & Bird LLP

(57) ABSTRACT

This invention describes a method for adjusting the loudness and the spectral content of digital audio signals in a real-time using warped spectral filtering. A warped processing module modifies a spectral content of a digital audio signal with a set of gains for a plurality of non-linearly-scaled frequency bands determined by a warping factor λ of a warped delay line. Warped delay line signals, generated by the warped delay line, are processed by a warped filter block containing multiple warped finite impulse response filters, e.g., Mth band filters, using individual warped spectral filtering in said plurality of the non-linearly-scaled frequency bands, which is followed by a conventional processing by a dynamic range control/equalization block. The present invention describes another innovation, that is embedding the warped processing module in a two-channel quadrature mirror filter (QMF) bank for improving processing efficiency at high sample rates.

16 Claims, 6 Drawing Sheets

50, 10, Warped processing module (low frequency branch), 20, 18, DRC/EQ Module, 12, 14, 30, 32, 22, QMF analysis block (two bands, down-sampled by 2), Warped delay line, Warped filter block, DRC/EQ block, QMF synthesis block (up-sampled by 2), Digital signal(f/2), 28, 16, 35, 34, Audio input signal (f), Digital audio output signal (f), Complementary digital signal (f/2), 11, 36, 38, Matching Delay module, Variable gain block, 24, 40, 26, 42, Complementary module (high frequency branch), 10a

(56) References Cited

OTHER PUBLICATIONS

International Search Report (5 pages) and Written Opinion of the International Searching Authority (5 pages), 10 pages total.

Multiband Warped Filter Equalizer Design for Loudspeaker Systems, Wang Peng, et al, 2000 IEEE ICASSP, Proc., vol. 2, p. II 913-II 916 Jun. 5-9, 2000.

Frequency Warping in the Design and Implementation of Fixed-Point Audio Equalizers, Chalee Asavathiratham, et al, Proc. 1999 IEEE Workshop on Applications of Signal Processing to Audio and Acoustics, New Palz, New York, Oct. 17-20 1999, pp. 55-58.

A Comparison Between Multi-Channel Audio Equalization Filters Using Warping, Sunil Bharitkar, et al, 2003 IEEE Workshop on Applications of Signal Processing to Audio an Acoustics, Oct. 19-22 New Paltz, NY, pp. 63-66.

Warped Filters and Their Audio Applications, Matti Karjalainen, et al, 1997 IEEE ASSP Workshop on Applications of Signal Processing to Audio and Acoustics, 19-2 Oct. 1997, 4pp.

"Tunable Digital Frequency Response Equalizaiton Filters", P. Regalia et al., IEEE Trans. Acoustics, Speech and Signal Processing, vol. ASSP-35, No. 1, Jan. 1987, pp. 118-120.

"Multi-Level IIR Digital Filters", R. Ansari, IEEE Trans. on Circuits and Systems, vol. CAS-33, No. 3, Mar. 1986, pp. 337-341.

"Frequency Warping in the Design and Implementation of Fixed-Point Audio Equalizers", C. Asavathiratham et al, Proc. 1999 IEEE Workshop on Appl. of Signal Processing to Audio, pp. 55-58.

"Warped Discrete-Fourier Transform: Theory and Applications", A. Makur et al, IEEE Trans. on Circuits and Systems-Fundamental Theory and Appl., vol. 48, No. 9, Sep. 2001, pp. 1086-1093.

P. Vadyanathan, "Multirate Systems and Filter Banks", Prentice Hall, 1993, Sec. 4.6.5, pp. 164-168, and pp. 203-204.

"Digital Audio Signal Processing," U. Zolzer et al, Chapter 7, Dynamic Range Control, pp. 207-219 (from the Internet).

* cited by examiner

DYNAMIC RANGE CONTROL AND EQUALIZATION OF DIGITAL AUDIO USING WARPED PROCESSING

CROSS-REFERENCE TO RELATED APPLICATION

This application is a continuation of U.S. application Ser. No. 10/830,715 filed Apr. 23, 2004 now U.S. Pat. No. 7,587,254.

FIELD OF THE INVENTION

This invention generally relates to acoustic signal processing and more specifically to adjusting a loudness and a spectral content of digital audio signals in a real-time using warped spectral filtering.

BACKGROUND OF THE INVENTION

1. Field of Technology and Background

A time-varying modification of a loudness is commonly referred to as a dynamic range control (DRC), and it is typically used to amplify quiet audio signals so that they become clearly audible. A static modification of a spectral content is commonly referred to as an equalization (EQ), and it is typically used to amplify some parts of the spectrum according to user preferences, or in order to compensate for a non-ideal response of a transducer such as a loudspeaker. Consequently, the DRC can be used to maximize the loudness of a music track or a ringing-tone whereas the EQ can be used to implement a 'bass-boost'.

2. Problem Formulation

When a digital audio source is played back to a listener, the result is often unsatisfactory because the audio source is intended for a playback under different conditions. For example, a user will find it difficult to hear a quiet part of a song on a portable music player while walking down a busy city street. Similarly, the user will find it difficult to hear the bass in a music track when using a set of poor headphones.

The invention addresses the problem that in practice the original audio source is often not appropriate for a user's acoustic environment and hardware used for a playback. Better results can be achieved if the audio source is processed according to requirements of the user. In particular, it is advantageous to be able to produce a consistent loudness for the user of a portable device, and to ensure that the acoustic output is never too quiet and heard clearly by the user.

3. Prior art

Equalization (EQ)

The purpose of the EQ is to modify a signal's magnitude spectrum. The phase response of the EQ is important only in the sense that it must not vary too quickly as a function of frequency. As a rule of thumb the difference between the maximum and minimum of the group delay function should not be greater than 3 ms. As long as this constraint is satisfied the phase response is not important.

The desired magnitude response of the EQ is usually defined by a set of gains, for example five, where each gain specifies a target magnitude response within a certain frequency band. The frequency bands are usually unevenly spaced so that they are relatively narrow at low frequencies and relatively wide at high frequencies. The output from the EQ can then be calculated either by cascading a set of peak and shelving filters or by adding the outputs from a set of low-pass, high-pass, and band-pass filters. Cascading is the most natural choice since the resulting magnitude response is easy to predict (it is the product of the individual magnitude responses) whereas adding can cause unpredictable interference unless the phase response of the individual filters are the same. Linear phase FIR (finite impulse response) filters are very expensive to run in the lower frequency bands, so IIR (infinite impulse response) filters are most commonly used in practice, the $2^{nd}$ order IIR filters in particular. There are different ways to implement a cascade of peak and shelving filters. One simple method mixes the output from an all-pass filter with a direct signal as described by P. A. Regalia and S. K. Mitra, "Tunable Digital Frequency Response Equalization Filters", IEEE Transactions on Acoustics, Speech, and Signal Processing, Vol. ASSP-35, pp. 118-120, January 1987. A more sophisticated method based on the same technique can be used to design a so-called "multi-level filter" described by R. Ansari, "Multi-level IIR Digital Filters", IEEE Trans. Circuits and Systems, Vol. Cas-33, pp. 337-341, March 1986.

When a number of signals are added together, their sum depends on the phase of the individual signals. It is disclosed in U.S. Pat. No. 5,892,833 "Gain and Equalization System and Method", by C. Maag, L. Parker and Q. Jensen, that it is possible to achieve a low group delay as well as a good approximation to the target magnitude response by adding together the outputs from a number of the IIR filters. It is described in "Multirate Systems and Filter Banks", Section 4.6.5 by P. P. Vaidyanathan, Prentice Hall, 1993, how to use a polyphase implementation to make an adjustable multi-level filter. The output from the filter is a sum of the outputs from a filterbank, and when the elements of the filterbank are the polyphase components of Mth band filters (also called Nyquist filters) the overall frequency response is guaranteed to be smooth everywhere (no unpredictable phasing artifacts occur in the transition regions).

The main problem with the methods mentioned above is that they are not very suitable when the bandwidths of the individual filters are very different, and since the perception of a pitch by a human ear is roughly logarithmic it is desirable to let the EQ modify the spectral content on a logarithmic frequency scale rather than a linear frequency scale. A technique exists, referred to as frequency warping, which allows the characteristics of the FIR filter to be mapped onto an approximately logarithmic frequency scale (frequency warping can also be applied to the IR filters but they become extremely sensitive to a noise and round-off errors, and they are rarely used in practice).

It is described by C. Asavathiratham, P. E. Beckmann, A. V. Oppenheim, "Frequency Warping in the Design and Implementation of Fixed-Point Audio Equalizers", pp. 55-58, Proc. 1999 IEEE Workshop on Applications of Signal Processing to Audio and Acoustics, New Paltz, N.Y., Oct. 17-20, 1999, how the frequency warping, implemented with a 16-bit fixed-point precision, can be used to equalize the response of a loudspeaker. It is described by A. Makur, S. K. Mitra, "Warped Discrete-Fourier Transform: Theory and Applications", pp. 1086-1093, IEEE Trans. Circuits and Systems I: Fundamental Theory and Applications, Vol. 48, No. 9. September 2001, how to implement a warped Discrete Fourier Transform (WDFT). The WDFF is a block transform that can be used to implement the EQ if it is followed by an inverse WDFT.

Dynamic Range Control (DRC)

There are two types of DRCs: a full-band and a multi-band. The full-band DRC applies a single time-varying gain to an input signal whereas a multi-band DRC uses a set of time-varying gains to adjust signal level within a number of frequency bands. The multi-band DRC essentially runs time-varying EQs whose gains are calculated from the input signal, which means that the multi-band DRC contains an EQ as one of its components. The performance of the EQ inside of the DRC is even more important than when the EQ is used as a stand-alone application since artifacts, such as phasing, are more clearly audible when the gains are time-varying than when they are constant.

The gain applied by the DRC is calculated from the level of the input signal. The full-band DRC estimates the total input level whereas the multi-band DRC estimates the level in each frequency band. The level estimate is converted to a gain from a so-called compression curve, which specifies the output level, in dBs, as a function of the input level, in dBs. The gain is not converted instantly, rather it converges exponentially to its target value with a time constant that depends on whether the current gain is to be increased or decreased. If the gain is decreased the time constant is referred to as an attack time. If the gain is increased the time constant is referred to as a release time. The release time is typically at least an order of magnitude greater than the attack time, and both the attack time and release time are typically shorter at high frequencies than at low frequencies. A look-ahead delay is inserted in order to compensate for the inherent delay in the processing necessary for the level estimation, and it also allows the DRC to anticipate sudden changes in the input signal level. For example, if a quiet section is followed by a loud transient, the DRC can turn down the gain a few milliseconds in advance of the transient so that the overall loudness remains roughly constant.

The above description of a DRC is readily available in textbooks (see for example Chapter 7 of "Digital Audio signal Processing", by U. Zölzer, John Wiley & Sons, 1997).

SUMMARY OF THE INVENTION

The object of the present invention is to provide a novel method for adjusting a loudness and a spectral content of digital audio signals in a real-time using warped spectral signal processing.

According to a first aspect of the invention, a warped processing module for a dynamic range control and equalization of a digital signal, comprises: a warped delay line, responsive to the digital signal with a pre-selected sampling frequency, for providing N+1 warped delay line signals $W_0, W_1, \ldots W_N$ with a predetermined or optionally variable warping factor λ determining a non-linear frequency scale factor for defining a plurality of non-linearly-scaled frequency bands within a frequency range corresponding to a half of said pre-selected sampling frequency, wherein N is an integer of at least a value of one; a warped filter block, responsive to said N+1 warped delay line signals $W_0, W_1, \ldots W_N$, for providing a warped filter block output signal based on warped spectral filtering of said N+1 warped delay line signals $W_0, W_1, \ldots W_N$ in said plurality of said non-linearly-scaled frequency bands, wherein a signal gain for each of the non-linearly-scaled frequency bands is set independently; and a dynamic range control/equalization (DRC/EQ) block, responsive to said warped filter block output signal, for providing a DRC/EQ output signal, thus providing said dynamic range control, equalization, or both said dynamic range control and said equalization of said digital signal based on said warped filter block output signal.

According further to the first aspect of the invention, the non-linearly-scaled frequency bands may be defined on an approximately logarithmic frequency scale.

Further according to the first aspect of the invention, the warped filter block may contain K warped finite impulse response filters, wherein K is an integer of at least a value of one and each of said K warped finite impulse response filters is responsive to said N+1 warped delay line signals $W_0, W_1, \ldots W_N$ and wherein each of said K warped finite impulse response filters provides a corresponding band output signal and said warped filter output signal comprises said K band output signals. Further, the dynamic range control/equalization (DRC/EQ) block may contain K DRC/EQ band blocks and each of said K DRC/EQ band blocks is responsive to a corresponding one of said K band output signals and provides the dynamic range control, the equalization or both the dynamic range control and the equalization of said corresponding one of said K band output signals, and wherein each of said K DRC/EQ band blocks provides a corresponding DRC/EQ band output signal and said DRC/EQ output signal comprises said K DRC/EQ band output signal.

Still further according to the first aspect of the invention, the warped filter block may contain K Mth-band filters, wherein K is an integer of at least a value of one and each of said K Mth-band filters is responsive to said N+1 warped delay line signals $W_0, W_1, \ldots$ and wherein each of said K Mth-band filters provides a corresponding band output signal and said warped filter output signal comprises said K band output signals.

According further to the first aspect of the invention, the warped processing module may be embedded between analysis and synthesis filter blocks referred to as a filter bank. Further, the analysis filter block may be responsive to an audio input signal with a sampling frequency $f_s$ and in a frequency range from 0 to $f_s/2$, and said analysis filter block may provide said digital signal with a reduced sampling frequency $f_{sr}=f_s/P$ which is equal to the pre-selected sampling frequency and in a low frequency branch, and may provide at least one complementary digital signal with the reduced sampling frequency $f_{sr}=f_s/P$ and in a high frequency branch, wherein P>1. Still further, the filter synthesis block may be responsive to the DRC/EQ output signal with the reduced sampling frequency $f_{sr}=f_s/P$ and to said at least one complementary output signal with the reduced sampling frequency $f_{sr}=f_s/P$ and may provide a digital audio output signal with the sampling frequency $f_s$ in the corresponding frequency range from 0 to $f_s/2$.

Still yet further according to the first aspect of the invention, P may be equal to two and the filter analysis block may be a two-channel quadrature mirror filter analysis block, said filter synthesis block may be a two-channel quadrature mirror filter synthesis block, said at least one complementary input signal may be a complementary input signal, said at least one complementary output signal may be a complementary output signal, said low frequency branch may be in a frequency range from 0 to $f_s/4$, said high frequency branch may be in the frequency range from $f_s/4$ to $f_s/2$, and the filter bank may be a two-channel quadrature mirror filter bank. Further, the warped processing block may be responsive to the digital signal and said DRC/EQ output signal may be generated by the warped processing block using warped processing in said low frequency branch. Still further, the complementary digital signal may be provided to a complementary module and said complementary output signal may be generated by the complementary module in said high frequency branch to match the processing in the low and the high frequency branches at a cross-over frequency $f_s/4$ which separates the low and the high frequency branches. Yet still further, the complementary module may comprise: a matching delay module, responsive to the complementary digital signal, for providing a matched delay signal to match a frequency-dependent delay of the low frequency branch due to said warped spectral filtering by the warped filter block at the cross-over frequency $f_s/4$; and a variable gain block, responsive to said matched delay signal and to a high-band gain signal, for providing the complementary output signal to match a frequency-dependent gain of the low frequency branch due to said warped spectral filtering by the warped filter block at the cross-over frequency $f_s/4$. Yet further, the high-band gain signal may be a gain of a highest band of the plurality of said non-linearly-scaled frequency bands processed by the warped processing module and said high-band gain signal may be provided by the dynamic range control/equalization (DRC/EQ) block.

According further still to the first aspect of the invention, the warped processing module may be embedded between two-channel quadrature mirror filter analysis and synthesis blocks referred to as a two-channel quadrature mirror filter bank and said warped filter block may contain K warped finite impulse response filters, wherein K is an integer of at least a value of one and each of said K warped finite impulse response filters is responsive to said N+1 warped delay line signals $W_0, W_1, \ldots W_N$ and wherein each of said K warped finite impulse response filters provides a corresponding band output signal and said warped filter output signal comprises said K band output signals.

According yet further still to the first aspect of the invention, the warped processing module may be embedded between two-channel quadrature mirror filter analysis and synthesis blocks referred to as a two-channel quadrature mirror filter bank and said warped filter block may contain K Mth-band filters, wherein K is an integer of at least a value of one and each of said K Mth-band filters is responsive to said N+1 warped delay line signals $W_0, W_1, \ldots, W_N$ and wherein each of said K Mth-band filters provides a corresponding band output signal and said warped filter output signal comprises said K band output signals.

Yet still further according to the first aspect of the invention, the warped processing module may be contained in a portable electronic device, an electronic communication device, a mobile electronic device, a mobile phone.

According to a second aspect of the invention, a warped filter bank for a dynamic range control and equalization of an audio input signal using warped processing, comprises: a two-channel quadrature mirror filter (QMF) analysis block, responsive to the audio input signal with a sampling frequency $f_s$ and in a corresponding frequency range from 0 to $f_s/2$, for providing a digital signal with a reduced sampling frequency $f_{sr}=f_s/2$ and in a corresponding low frequency branch with a frequency range from 0 to $f_s/4$, for providing a complementary digital signal with the reduced sampling frequency $f_{sr}=f_s/2$ and in a corresponding high frequency branch with the frequency range from $f_s/4$ to $f_s/2$; a warped processing module for the low frequency branch, responsive to the digital signal, for providing a DRC/EQ output signal with the reduced sampling frequency $f_{sr}=f_s/2$ using a warped processing in a plurality of non-linearly-scaled frequency bands within said low frequency branch; a complementary module for the high frequency branch, responsive to said complementary digital signal, for providing a complementary output signal with the reduced sampling frequency $f_{sr}=f_s/2$ to match processing in the low and the high frequency branches at a cross-over frequency $f_s/4$ which separates the low and the high frequency branches; and a two-channel quadrature mirror filter (QMF) synthesis block, responsive to the DRC/EQ output signal and to the complementary output signal, for providing a digital audio output signal with the sampling frequency $f_s$ thus providing said dynamic range control, equalization, or both said dynamic range control and said equalization of said audio input signal using said warped processing.

According further to the second aspect of the invention, the warped processing module may comprise: a warped delay line, responsive to the digital signal, for providing N+1 warped delay line signals $W_0, W_1, \ldots W_N$ with a predetermined or optionally variable warping factor $\lambda$ determining a non-linear frequency scale factor for defining a plurality of non-linearly-scaled frequency bands within said low frequency branch, wherein N is an integer of at least a value of one; a warped filter block, responsive to said N+1 warped delay line signals $W_0, W_1, \ldots W_N$, for providing a warped filter block output signal based on warped spectral filtering of said N+1 warped delay line signals $W_0, W_1, \ldots W_N$ in said plurality of said non-linearly-scaled frequency bands, wherein a signal gain for each of the non-linearly-scaled frequency bands is set independently; and a dynamic range control/equalization (DRC/EQ) block, responsive to said warped filter block output signal, for providing the DRC/EQ output signal, thus providing said dynamic range control, equalization, or both said dynamic range control and said equalization of said digital signal based on said warped filter block output signal. Further, the warped filter block may contain K warped finite impulse response filters, wherein K is an integer of at least a value of one and each of said K warped finite impulse response filters is responsive to said N+1 warped delay line signals $W_0, W_1 \ldots W_N$ and wherein each of said K warped finite impulse response filters provides a corresponding band output signal and said warped filter output signal comprises said K band output signals. Still further, the dynamic range control/equalization (DRC/EQ) block contains K DRC/EQ band blocks and each of said K DRC/EQ band blocks is responsive to a corresponding one of said K band output signals and provides the dynamic range control, the equalization or both the dynamic range control and the equalization of said corresponding one of said K band output signals, and wherein each of said DRC/EQ band blocks provides a corresponding DRC/EQ band output signal and said DRC/EQ output signal comprises said K DRC/EQ band output signal. Yet still further, the warped filter block may contain K Mth-band filters, wherein K is an integer of at least a value of one and each of said K Mth-band filters is responsive to said N+1 warped delay line signals $W_0, W_1, \ldots W_N$ and wherein each of said K Mth-band filters provides a corresponding band output signal and said warped filter output signal comprises said K band output signals.

Further according to the second aspect of the invention, the non-linearly-scaled frequency bands may be defined on an approximately logarithmic frequency scale.

Still further according to the second aspect of the invention, the complementary module may comprise: a matching delay module, responsive to the complementary digital signal, for providing a matched delay signal to match a frequency-dependent delay of the low frequency branch due to said warped spectral filtering by the warped filter block at the cross-over frequency $f_s/4$; and a variable gain block, responsive to said matched delay signal and to a high-band gain signal, for providing the complementary output signal to match a frequency-dependent gain of the low frequency branch due to said warped spectral filtering by the warped filter block at the cross-over frequency $f_s/4$. Further, the high-band gain signal may be a gain of a highest band of the plurality of said non-linearly-scaled frequency bands processed by the warped processing module and said high-band gain signal may be provided by a dynamic range control/equalization (DRC/EQ) block.

According further to the second aspect of the invention, the two-channel quadrature mirror filter analysis block and the synthesis block may be designed based on a predetermined criterion to reduce an aliasing between the DRC/EQ output signal and to the complementary output signal in a crossover frequency region around the cross-over frequency $f_s/4$.

According still further to the second aspect of the invention, the warped filter bank may be contained in a portable electronic device, an electronic communication device, a mobile electronic device, or a mobile phone.

According to a third aspect of the invention, a method of a dynamic range control and equalization of a digital signal with a pre-selected sampling frequency, using a warped processing module, comprises the steps of: providing N+1 warped delay line signals $W_0$, $W_1$ . . . $W_N$ with a predetermined or optionally variable warping factor λ determining a non-linear frequency scale factor for defining a plurality of non-linearly-scaled frequency bands within a frequency range corresponding to a half of said pre-selected sampling frequency, said N+1 warped delay line signals $W_0$, $W_1$, . . . $W_N$ are provided by a warped delay line of said warped processing module in response to the digital signal with said pre-selected sampling frequency; providing a warped filter block output signal based on warped processing of said N+1 warped delay line signals $W_0$, $W_1$, . . . $W_N$ in said plurality of said non-linearly-scaled frequency bands by a warped filter block of said warped processing module in response to said N+1 warped delay line signals $W_0$, $W_1$, . . . $W_N$, wherein a signal gain for each of the non-linearly-scaled frequency bands is set independently; and providing a DRC/EQ output signal in response to said warped filter block output signal by a dynamic range control/equalization (DRC/EQ) block of said warped processing module thus providing said dynamic range control, equalization, or both said dynamic range control and said equalization of said digital signal.

According further to the third aspect of the invention, the non-linearly-scaled frequency bands may be defined on a logarithmic frequency scale.

Further according to the third aspect of the invention, the warped filter block may contain K warped finite impulse response filters, wherein K is an integer of at least a value of one and each of said K warped finite impulse response filters is responsive to said N+1 warped delay line signals $W_0$, $W_1$, . . . $W_N$ and wherein each of said K warped finite impulse response filters provides a corresponding band output signal and said warped filter output signal comprises said K band output signals. Further, the dynamic range control/equalization (DRC/EQ) block may contain K DRC/EQ band blocks and each of said K DRC/EQ band blocks may be responsive to a corresponding one of said K band output signals and provides the dynamic range control, the equalization or both the dynamic range control and the equalization of said corresponding one of said K band output signals, and wherein each of said K DRC/EQ band blocks provides a corresponding DRC/EQ band output signal and said DRC/EQ output signal comprises said K DRC/EQ band output signal.

Still further according to the third aspect of the invention, the warped filter block may contain K warped finite impulse response filters, wherein K is an integer of at least a value of one and each of said K warped finite impulse response filters is responsive to said N+1 warped delay line signals $W_0$, $W_1$, . . . $W_N$ and wherein each of said K warped finite impulse response filters provides a corresponding band output signal and said warped filter output signal comprises said K band output signals. Further, the dynamic range control/equalization (DRC/EQ) block contains K DRC/EQ band blocks and each of said K DRC/EQ band blocks may be responsive to a corresponding one of said K band output signals and may provide the dynamic range control, the equalization or both the dynamic range control and the equalization of said corresponding one of said K band output signals, and wherein each of said K DRC/EQ band blocks provides a corresponding DRC/EQ band output signal and said DRC/EQ output signal comprises said K DRC/EQ band output signal. Still further, said warped filter block may contain K Mth-band filters, wherein K is an integer of at least a value of one and each of said K Mth-band filters is responsive to said N+1 warped delay line signals $W_0$, $W_1$, . . . $W_N$ and wherein each of said K Mth-band filters may provide a corresponding band output signal and said warped filter output signal comprises said K band output signals.

According further to the third aspect of the invention, the warped processing module may be embedded between two-channel quadrature mirror filter analysis and synthesis blocks referred to as a two-channel quadrature mirror filter bank. Further, before the step of providing N+1 warped delay line signals $W_0$, $W_1$, . . . $W_N$, the method may comprise the step of: providing by said two-channel quadrature mirror filter analysis block the digital signal with a reduced sampling frequency $f_{sr}=f_s/2$, which is equal to the pre-selected sampling frequency, and in a corresponding low frequency branch with a frequency range from 0 to $f_s/2$ in response to an audio input signal with a sampling frequency $f_s$ and in a corresponding frequency range from 0 to $f_s/2$ and providing a complementary digital signal with the reduced sampling frequency $f_{sr}=f_s/2$ in a corresponding high frequency branch with the frequency range from $f_s/4$ to $f_s/2$ to a complementary module. Still further, the method may comprise the steps of: generating a complementary output signal in said high frequency branch by the complementary module to match processing in the low and the high frequency branches at a cross-over frequency $f_s/4$ which separates the low and the high frequency branches in response to said complementary digital signal and providing said complementary output signal to the two-channel quadrature mirror synthesis block; providing to the two-channel quadrature mirror synthesis block said DRC/EQ output signal with the reduced sampling frequency $f_{sr}=f_s/2$ generated by warped processing of the digital signal by the warped processing module; and providing a digital audio output signal with the sampling frequency $f_s$ and the corresponding frequency range from 0 to $f_s/2$ by the two-channel quadrature mirror synthesis block in response to said DRC/EQ output signal and to said complementary output signal. Yet still further, the step of generating a complementary output signal may comprise the steps of: providing a matched delay signal to match a frequency-dependent delay of the low frequency branch due to said warped spectral filtering by the warped filter block at the cross-over frequency $f_s/4$ by a matching delay module of said complementary module in response to said complementary digital signal; providing a high-band gain signal, which is a gain of a highest band of the plurality of said non-linearly-scaled frequency bands processed by the warped processing module, to a variable gain block of the complementary module by the a dynamic range control/equalization (DRC/EQ) block; and providing the complementary output signal by the variable gain block in response to said matched delay signal and to a high-band gain signal.

According still further to the third aspect of the invention, the warped processing module may be embedded between two-channel quadrature mirror filter analysis and synthesis blocks referred to as a two-channel quadrature mirror filter bank and wherein said warped filter block may contain K Mth-band filters, wherein K is an integer of at least a value of one and each of said K Mth-band filters is responsive to said N+1 warped delay line signals $W_0$, $W_1$, . . . $W_N$ and wherein each of said K Mth-band filters provides a corresponding band output signal and said warped filter output signal comprises said K band output signals.

The present invention is computationally very efficient in terms of both required memory resources and a number of MIPS (millions instructions per seconds). The key component is the WFIR filter bank suitable for logarithmically spaced center frequencies. At high sample rates a 2-band QMF bank is used to reduce the processing load, both in terms of the MIPS and the memory resources, by approximately 40%. The WFIR filter bank uses a carefully selected set of Mth band filters that provide an excellent match to the target magnitude response defined by a set of gains. The group delay function does not depend on the gains so there are no phasing artifacts even when the gains are time-varying.

And finally, the present invention enables the WFIR filter bank to run at different sampling frequencies, and the properties of the Mth band filters ensure good performance even in extreme cases, such as when using very aggressive settings to achieve a powerful amplification of weak signals. It is possible to run the WFIR filter bank, with a modest decrease in the signal-to-noise ratio, in a 16-bit precision on platforms that do not support floating-point maths or 32-bit operations.

BRIEF DESCRIPTION OF THE DRAWINGS

For a better understanding of the nature and objects of the present invention, reference is made to the following detailed description taken in conjunction with the following drawings, in which.

BEST MODE FOR CARRYING OUT THE INVENTION

The present invention provides a method for adjusting the loudness and the spectral content of digital audio signals in a real-time using digital signal processing based on warped spectral filtering. According to the present invention, a warped processing module modifies a spectral content of a digital audio signal with a set of gains that specify a desired magnitude response in a number of non-linearly-scaled frequency bands. A warping factor $\lambda$ determines a non-linear frequency scale factor for defining a plurality of non-linearly-scaled frequency bands within a frequency range corresponding to a half of a pre-selected sampling frequency of a digital input signal.

The major components of the warped processing block comprise a warped delay line generating warped delay line signals, a warped filter block for warped spectral filtering of said warped delay line signals in said plurality of the non-linearly-scaled frequency bands separately in each band, and a block having conventional dynamic range control (DRC) and/or equalization (EQ) capabilities. According to the present invention, the warped filter block can contain multiple warped finite impulse response filters, e.g., Mth band filters for implementing said warped spectral filtering.

The present invention describes another innovation, that is embedding the warped processing module between two-channel quadrature mirror filter analysis and synthesis blocks referred to as a two-channel quadrature mirror filter (QMF) bank, which allows to improve a processing efficiency at high sample rates, because the processing can be performed at a lower sampling frequency.

The method can be used to customize the level and character of an audio sound produced by a portable device so that a good performance is possible regardless of an acoustic environment and a quality of transducers used for a playback. The present invention can be run in either "EQ mode", "DRC mode" or both.

Figure 1A:
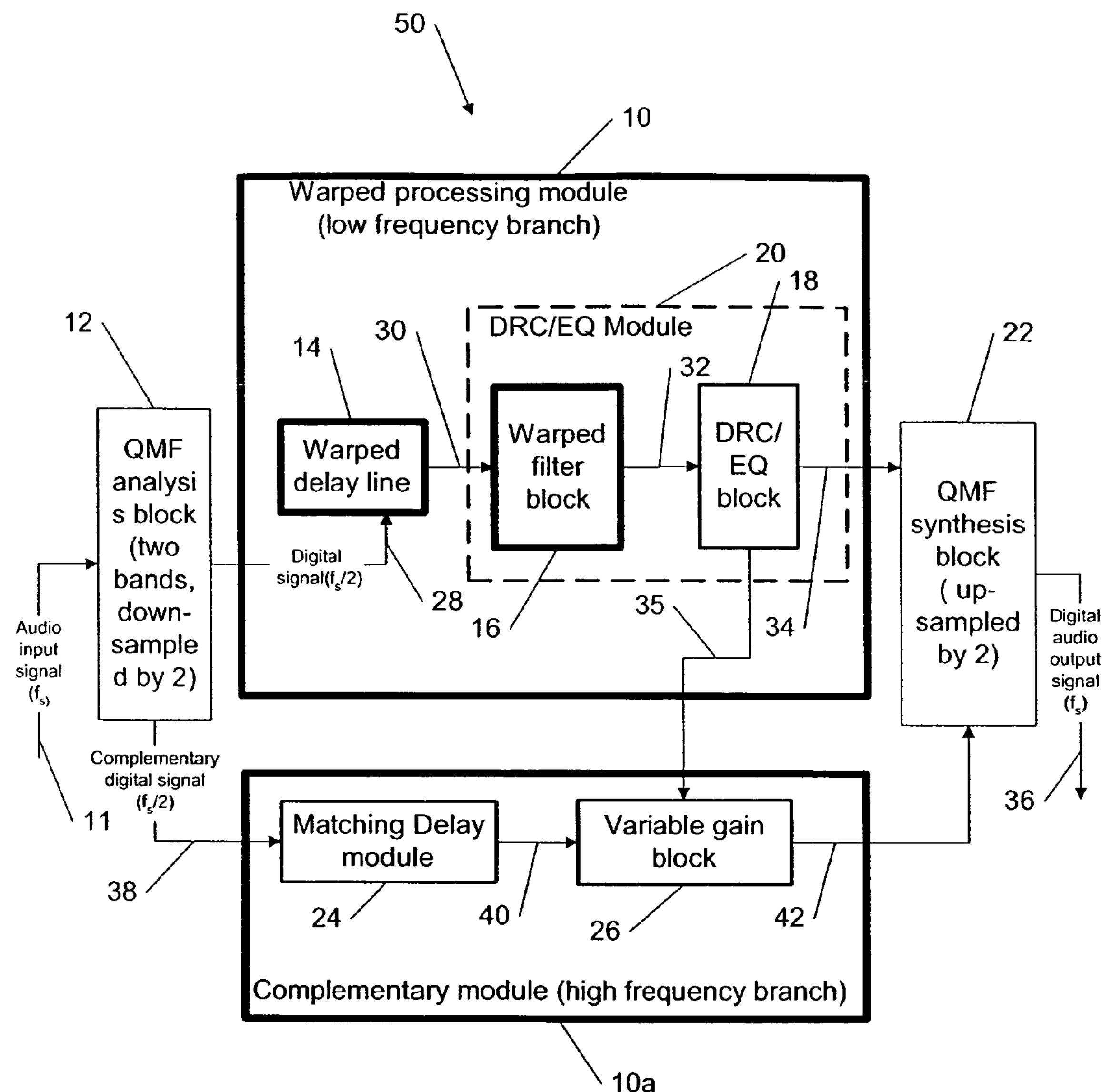
FIGS. 1*a* and 1*b* show examples of a warped processing module embedded between two-channel quadrature mirror filter blocks (filter-bank implementation), according to the present invention.

FIG. 1*a* shows one example among others of a two-channel quadrature mirror filter (QMF) bank digital processing system 50, referred to as a "warped filter bank" in the text, for a dynamic range control and equalization of an audio input signal 11 using the warped digital signal processing based on the warped spectral filtering, wherein a warped processing module 10 is embedded between two-channel quadrature mirror filter (QMF) analysis and synthesis blocks 12 and 22, respectively, referred to as a two-channel QMF filter bank, according to the present invention. Though FIG. 1*a* shows the example of embedding the warped processing module 10 in the warped filter bank 50, the present invention also applies to the warped processing module 10 as a stand-alone digital processing unit as one of many alternatives.

The two-channel QMF analysis block 12, in response to the audio input signal 11 with a sampling frequency $f_s$ and in a corresponding frequency range from 0 to $f_s/2$, provides a digital signal 28 with a reduced sampling frequency $f_{sr}=f_s/2$ and in a corresponding low frequency branch with a frequency range from 0 to $f_s/4$, and also provides a complementary digital signal 38 with the reduced sampling frequency $f_{sr}=f_s/2$ and in a corresponding high frequency branch with the frequency range from $f_s/4$ to $f_s/2$.

It is noted that the reduced sampling frequency is $f_{sr}=f_s/2$ for the example of FIG. 1*a* utilizing the two-channel QMF filter bank, but for a variety of other applications utilizing different types of filter banks, the reduced sampling frequency can be expressed as $f_{sr}=f_s/P$ wherein $P>1$. Typically $P=2$ for most practical purposes and for the preferred embodiment of the present invention shown in FIG. 1*a*.

However, the preferred embodiment utilizing 2-channel concept ($P=2$) shown in FIG. 1*a* can be further extended to possible applications with P not equal to two, according to the present invention. For example, a higher order filter bank (not necessarily a QMF filter bank) can be used to split up the signal 11 into more than two bands, or a "nested filter bank" (not necessarily the QMF filter bank) can be used such that the warped filter bank 50 of FIG. 1*a* can form a low-frequency branch of a two-channel QMF bank, etc. Furthermore, it is also possible to extend the principle of matched processing to include more complex filtering operations in the high-frequency branch. For example, the high-frequency branch can be split up into two or more bands, with the lowest of those bands being matched to the low-frequency branch at a cross-over frequency.

The two-channel QMF analysis block 12 of FIG. 1*a* is basically designed using the prior art knowledge but also can be modified for improving the performance of the warped digital processing as described below, according to the present invention.

The warped processing module 10 for the low frequency branch shown in FIG. 1*a* represents a major innovation described in the present invention and provides a desired DRC/EQ output signal 34 with the reduced sampling frequency $f_{sr}=f_s/2$ using a warped processing in a plurality of non-linearly-scaled frequency bands within said low frequency branch. Specifically the warped processing module 10 comprises a warped delay line 14 which is, in response to said signal 28, provides N+1 warped delay line signals $W_0$, $W_1$, . . . $W_N$ 30 (N is an integer of at least a value of one) with a predetermined or optionally variable warping factor λ determining a non-linear frequency scale factor for defining a plurality of non-linearly-scaled frequency bands within the low frequency branch. An example for implementing the warped delay line 14 is provided below.

The key component of the warped processing module 10 is a warped filter block 16, which, in response to said N+1 warped delay line signals $W_0$, $W_1$, . . . $W_N$ 30, provides a warped filter block output signal 32 based on warped spectral filtering of said N+1 warped delay line signals $W_0$, $W_1$, . . . $W_N$ 30 in said plurality of said non-linearly-scaled frequency bands, wherein a signal gain for each of the non-linearly-scaled frequency bands is set independently.

Typically the warped filter block 16 contains K warped finite impulse response filters 16-1, 16-2, . . . , 16-K (K is an integer of at least a value of one) and each of said K warped finite impulse response filters 16-1, 16-2, . . . , 16-K, in response to said N+1 warped delay line signals $W_0$, $W_1$, . . . $W_N$ 30, provides a corresponding band output signal 32-1, 32-2, . . . or 32-K such that said warped filter output signal 32 is comprised of said K band output signals 32-1, 32-2, . . . , 32-K. Examples for implementing warped the filter block 16 using K warped finite-impulse response (WFIR) filters including an important practical case of using K Mth band filters are provided below.

The last component of the warped processing module 10 is a DRC/EQ block 18, which is in response to the warped filter block output signal 32, provides a DRC/EQ output signal 34. The block 18 can provide multi-band DRC, EQ or combination of both, according to the present invention, and examples are provided below. The DRC/EQ block 18 is designed using the prior art knowledge. The DRC/EQ block 18 and the warped processing module 10 together form a DRC/EQ module 20, as shown in FIG. 1*a*.

A complementary module 10*a* for the high frequency branch, shown in FIG. 1*a*, is responsive to the complementary digital signal 38 from the two-channel QMF analysis block 12 and provides a complementary output signal 42 with the reduced sampling frequency $f_{sr}=f_s/2$ to match processing in the low and the high frequency branches at a cross-over frequency $f_s/4$, which separates the low and the high frequency branches. The complementary module 10*a* is novel and represents another important innovation according to the present invention.

Typically, the complementary module 10*a* comprises (as shown in FIG. 1*a*) a matching delay module 24, which, in response to the complementary digital signal 38, provides a matched delay signal 40 to match a frequency-dependent delay of the low frequency branch due to said warped spectral filtering by the warped filter block 16 at the cross-over frequency $f_s/4$.

Another important component of the complementary module 10*a* is a variable gain block 26, which, in response to said matched delay signal 40 and to a high-band gain signal 35, provides the complementary output signal 42 by matching a frequency-dependent gain of the low frequency branch due to said warped spectral filtering by the warped filter block 16 at the cross-over frequency $f_s/4$. The high-band gain signal 35 is a gain of a highest band of the plurality of said non-linearly-scaled frequency bands processed by the warped processing module 10 and said high-band gain signal 35 is provided to the variable gain block 26 by a dynamic range control/equalization (DRC/EQ) block 18.

Finally, FIG. 1*a* shows a synthesis block 22 (per the prior art as the block 12 described above), which, in response to the DRC/EQ output signal 34 and to the complementary output signal 42, provides a digital audio output signal 36 with the sampling frequency $f_s$ thus providing said dynamic range control, equalization, or both said dynamic range control and said equalization of the audio input signal 11, according to the present invention.

The warped filter bank 50 of FIG. 1*a* has a greater efficiency at high sample frequencies and it is advantageous to use the warped filter signal processing in the low frequency branch of the two-channel QMF analysis bank 12 only. The high-frequency branch is processed with the gain and the delay, possibly fractional or a series of a fractional and an integer delay, that match that of the low frequency branch in its highest frequency band as described above. In this way the output signal 36 from the two-channel QMF synthesis block 22 is almost completely without aliasing artifacts in the cross-over region around the cross-over frequency $f_s/4$ even though the warped digital signal processing is run at half the sampling frequency ($f_s/2$). However, said aliasing can be further controlled in the cross-over region by an appropriate design of the two-channel QMF analysis and synthesis blocks 12 and 22, respectively.

Figure 1B:
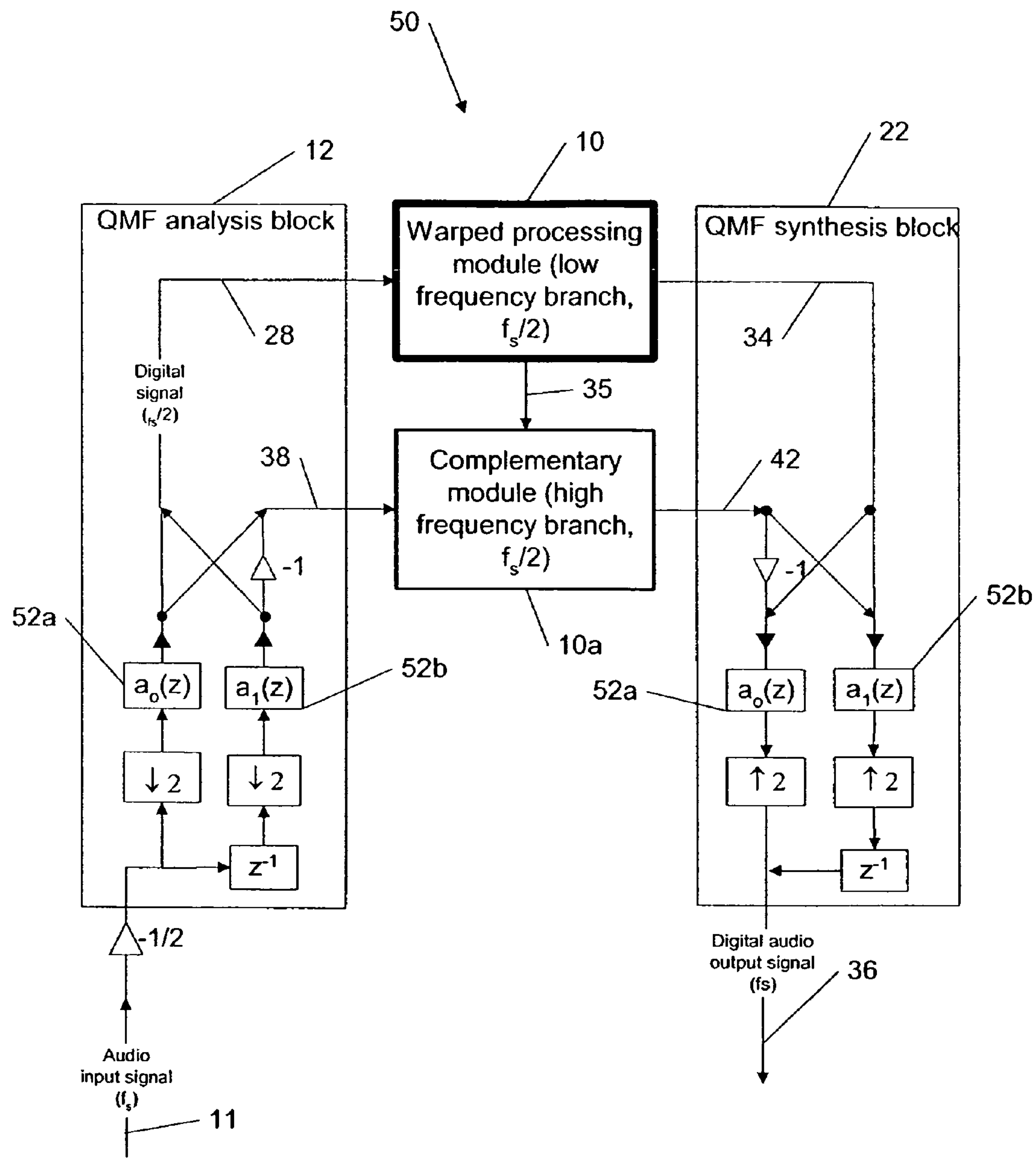

FIG. 1*b* shows the warped filter bank 50 of FIG. 1*a* with an emphasis on the blocks 12 and 22. The implementation of the blocks 12 and 22 using standard components (e.g., multipliers, decimators, conventional delay elements) is described in detail in "Multirate Systems and Filter Banks", by P. P. Vaidyanathan, Prentice Hall, pp. 203-204, 1993, and incorporated here by reference. However, it is noted, that, according to the present invention, by an appropriate design of all-pass filters 52*a* and 52*b* (e.g., by increasing filter orders) in FIG. 1*b* it is possible to improve the control of the aliasing in the cross-over region.

Figure 2:
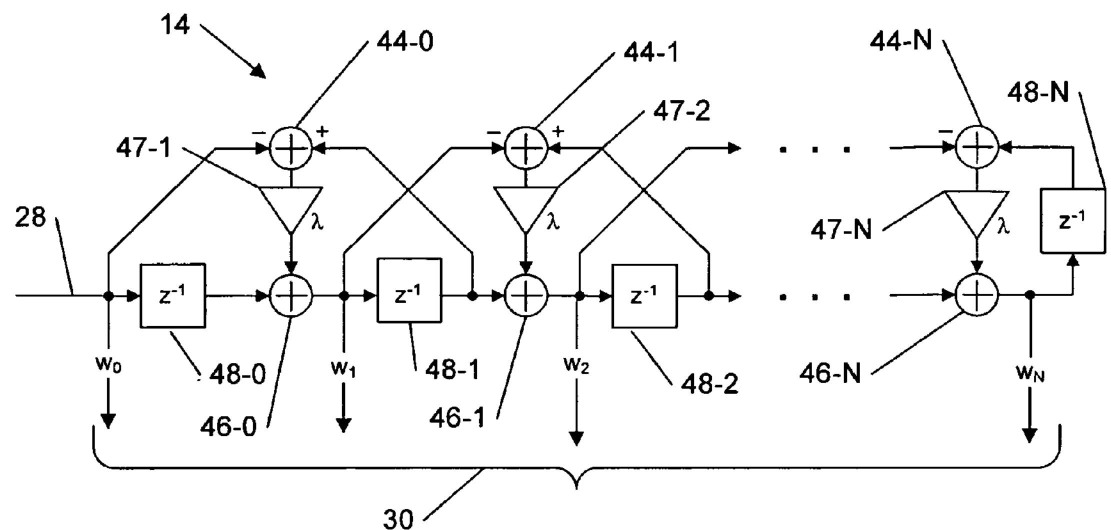
FIG. 2 shows an example of a warped delay line, according to the present invention.

FIG. 2 shows one example among others of the warped delay line 14, according to the present invention. In the warped delay line 14 the conventional delay element $z^{-1}$ is substituted with a first order all-pass filter, used as a building delay block, with a z-transform transfer function $A(z^{-1};\lambda)$ given by $$A(z^{-1};\lambda)=\frac{-\lambda+z^{-1}}{1-\lambda z^{-1}},\tag{1}$$

wherein λ is the warping factor described above. A structure shown in FIG. 2 implements this substitution. The warped delay line 14 contains feedback loops, multipliers 47-1, 47-2, . . . , 47-N, adders 46-0, 46-1, . . . , 46-N, and 464-0, 44-1, . . . , 44-N and standard $z^{-1}$ delay elements 48-0, 48-1, . . . 48-N, and generated N+1 warped delay line signals $W_0, W_1, \ldots W_N$ signals each from an Nth order all-pass filter, wherein N is an integer of at least a value of one.

Various implementations of the warped filter block 18 are discussed below.

A warped finite impulse response (WFIR) filter, as a building block of the warped filter block 18, performs a convolution by applying a finite impulse response (FIR) filter to a history of inputs (signals kept in a warped delay line 14). The difference between running a WFIR filter and an FIR filter is in the update of the delay line. The filtering operation required for a time-domain convolution is the same. More than one WFIR filter can be run at a small extra cost since the update of the warped delay line can be considered a constant overhead.

The WFIR filters essentially allow to implement filters designed on a frequency scale that is, e.g., logarithmic rather than linear. The warping factor λ determines how severely the frequency axis is compressed, or expanded, near zero frequency and the Nyquist frequency (in the example of FIG. 1*a*, the Nyquist frequency is $f_s/4$).

Figure 3:
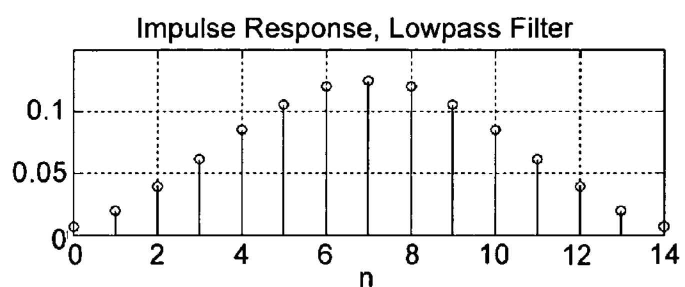
FIG. 3 is an example of an impulse response of a linear phase FIR low-pass filter with 15 coefficients as a simple version or a building element of a warped filter block, according to the present invention.

FIG. 3 shows one example among others of an impulse response of a linear phase FIR low-pass filter with 15 coefficients as a simple version of a building element of a warped filter block 16, according to the present invention.

Figure 4A:
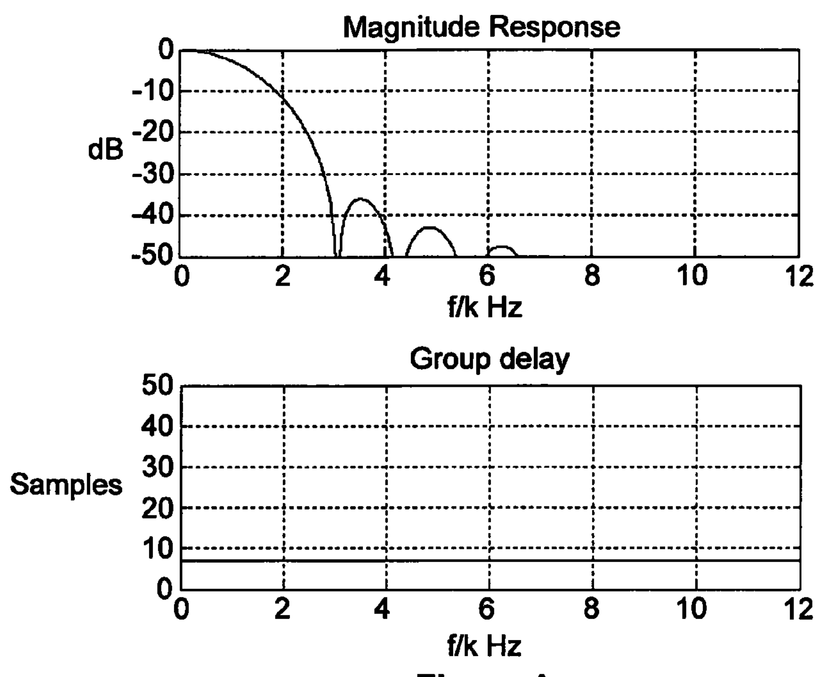
FIGS. 4*a* and 4*b* show an example of a magnitude response and a group delay of a low-pass WFIR filter of FIG. 3 with a reduced sampling frequency $f_{sr}=f_s/2=24$ kHz for a warping factor of a warped delay line $\lambda=0$ and $\lambda=-0.75$, respectively, according to the present invention.
Figure 4B:
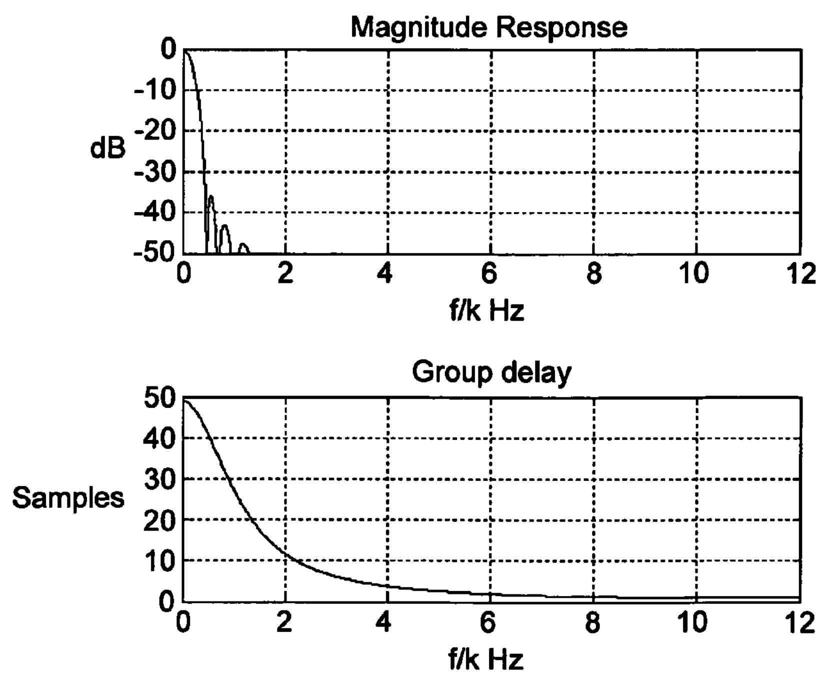

FIGS. 4*a* and 4*b* show one example among others of a magnitude response and a group delay of a z-transform filter transfer function for a low-pass WFIR filter of FIG. 3 with the reduced sampling frequency $f_{sr}=f_s/2=24$ kHz for a warping factor λ of a warped delay line 14 equal to λ=0 and λ=−0.75, respectively, according to the present invention. It is seen from FIG. 4*a* that the magnitude response has its first zero around 3 kHz and the group delay is constant (7 samples) at all frequencies (it is a linear case). The group delay is constant because the WIFR filter has a linear phase and the 7 samples correspond to the filter's center tap.

FIG. 4*b* shows the magnitude response and the group delay of the WFIR filter at λ=−0.75. It is seen that the magnitude response is compressed at low frequencies, and the first zero now occurs just below 500 Hz as opposed to 3 kHz. The group delay function is no longer flat: it decays from approximately 50 samples at zero frequency to 1 sample at the Nyquist frequency. This group delay function is the same as that of the center tap in the warped delay line, and it does not depend on the coefficients of the WFIR filter. This is very important because when different WFIR filters have the same phase response their outputs can be added together without creating phasing artifacts.

A certain type of filters, called Mth band filters or Nyquist filters, are very suitable for modifying the spectral content of audio signals because linear combinations of their outputs change in a very smooth and predictable way with frequency. The impulse response of an Mth band low-pass filter crosses zero every M samples (with the possible exception of the center tap). The remaining filters contained in the warped filter block 16 can be frequency-shifted versions of this low-pass version, according to the present invention. An example below demonstrates one possible scenario among many others how this can work in practice according to the present invention.

For M=8, the low-pass filter of FIG. 3 is used. All 15 coefficients are positive since the first zero-crossings must occur 8 taps away from the center tap, otherwise said low-pass filter is not the Mth band filter. The impulse response of this filter then must essentially resemble the shape of the sin(x)/x function, and in this example it includes the main lobe only, truncating the shape at the first zero-crossings.

From the low-pass Mth band filter, M−1=7 frequency-shifted versions can be generated. Of these 7 possible Mth band filters, 6 have coefficients that are complex numbers. These 6 filters then can be combined in pairs to form three band-pass Mth band filters. The resulting M−6/2=5 filters have real coefficients that can be calculated by a cosine modulation of the low-pass Mth band filter.

Figure 5:
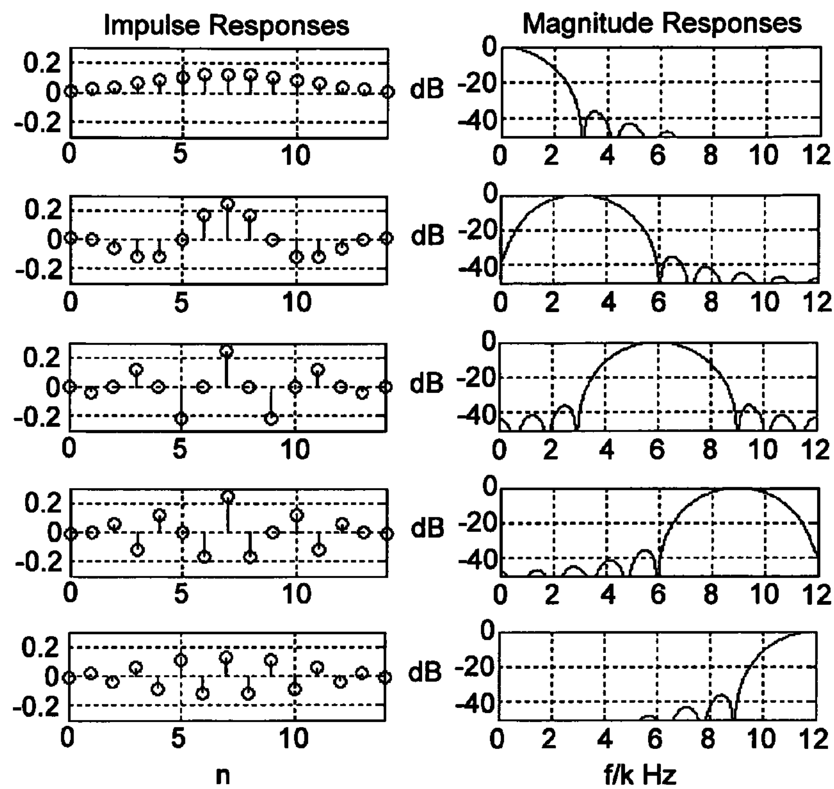
FIG. 5 shows an example of individual impulse and magnitude responses of five Mth band filters contained in a warped filter block of FIG. 1*a* based on a low-pass WFIR response of FIG. 3 with a reduced sampling frequency $f_{sr}=24$ kHz using a warping factor $\lambda=0$, according to the present invention.

FIG. 5 shows an example of individual impulse (left column) and magnitude (right column) responses of five Mth band filters contained in the warped filter block 16 of FIG. 1 based on the low-pass WFIR response of FIG. 3 with the reduced sampling frequency $f_{sr}=f_s/2=24$ kHz using a warping factor λ=0, according to the present invention. It is noted that the effective bandwidth of the low-pass (first) and high-pass (fifth) filters are only half of the band-pass filters.

Figure 6:
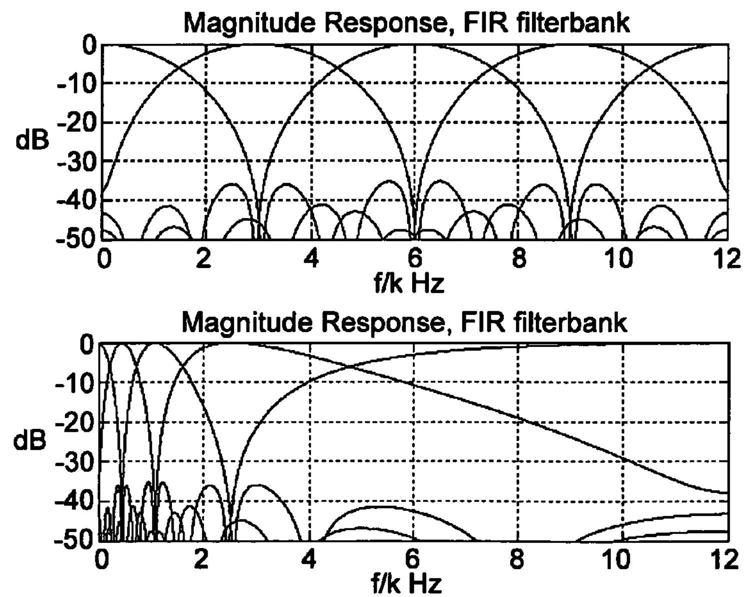
FIG. 6 shows an example of magnitude responses of combined five Mth band filters contained in a warped filter block of FIG. 1; top: WFIR implementation at $f_{sr}=24$ kHz, equivalent to FIG. 5 with a warping factor $\lambda=0$; Bottom: WFIR implementation at a reduced sampling frequency $f_{sr}=24$ kHz with a warping factor $\lambda=-0.75$, according to the present invention.

FIG. 6 shows one example among others of the magnitude responses of the combined five Mth band filters contained in the warped filter block 16 of FIG. 1; top: WFIR implementation at $f_{sr}=24$ kHz, equivalent to FIG. 5 with a warping factor λ=0; bottom: WFIR implementation at $f_{sr}=24$ kHz with a warping factor λ=−0.75. FIG. 6 illustrates how the magnitude responses shown in FIG. 5 are compressed at low frequencies when the warping factor is not zero (λ=−0.75) and inputs are taken from a warped delay line 14. The magnitude responses shown in FIG. 6 add up to one regardless of the value of λ, which is facilitated by a proper choice of the low-pass Mth band filter as discussed further in the text.

Figure 7:
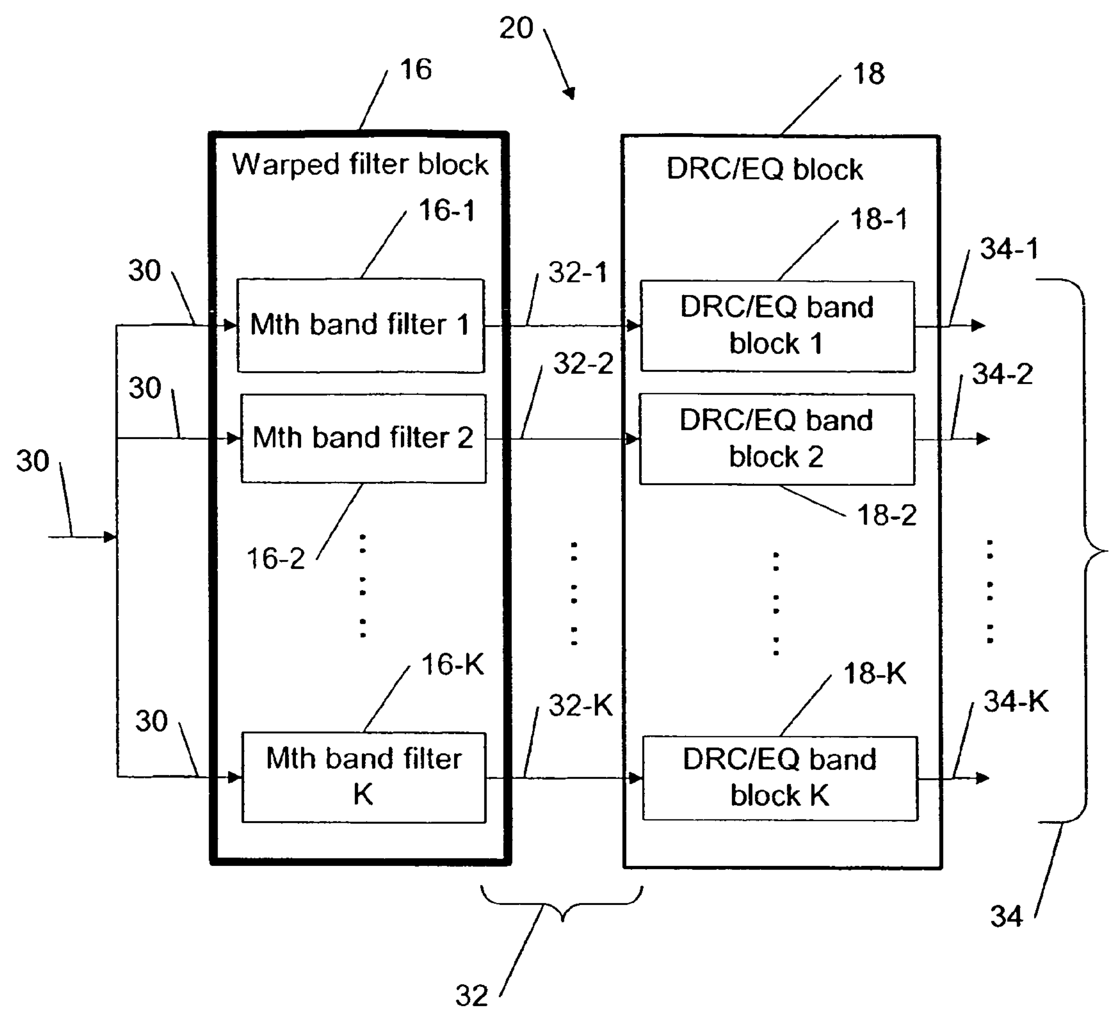
FIG. 7 shows an example of implementation for a DRC/EQ module using K Mth band filters, according to the present invention

FIG. 7 shows one example among others, according to the present invention, of implementing of a DRC/EQ module 20 (see FIG. 1*a*) using K Mth band filters 16-1, 16-2, . . . 16-K contained in the warped filter block 16 with the corresponding K DRC/EQ band blocks 18-1, 18-2, . . . , 18-K contained in DRC/EQ block 18 such that each of said K DRC/EQ band blocks 18-1, 18-2, . . . , 18-K, in response to a corresponding one of said K band output signals 32-1, 32-2, . . . , 32-K, provides the dynamic range control, the equalization or both the dynamic range control and the equalization of said corresponding one of said K band output signals 32-1, 32-2, . . . , and 32-K, that is each of the DRC/EQ band blocks 18-1, 18-2, . . . , 18-K provides a corresponding DRC/EQ band output signal 34-1, 34-2, . . . , or 34-K such that the DRC/EQ output signal 34 comprises the K DRC/EQ band output signal 34-1, 34-2, . . . , 34-K. The example of FIG. 7 can be applied to a stereo signal 30, wherein two components of the stereo signals require separate processing by K Mth band filters 16-1, 16-2, . . . 16-K (two filters for each band) but both stereo components for each bands can be processed by the corresponding DRC/EQ band block of the K DRC/EQ band blocks 18-1, 18-2, . . . , 18-K. When the DRC is performed on a stereo signal, the level estimation is usually based on the sum of said two stereo components for each band of FIG. 7 so that the gains are the same for said two stereo components to avoid stereo image shifting as described in "Digital Audio signal Processing", by U. Zölzer, John Wiley & Sons, 1997, p. 219.

When the warped filter bank 50 is based on a cosine modulation of the low-pass Mth band filter, the magnitude response of the sum of the filter bank's impulse responses is guaranteed to add up to a constant. However, this constant is not necessarily one, and this is unfortunate since it is important that the input is passed straight through without a change in level when the gain is one in all the bands. An additional constraint that applies to the sum of the frequency responses must be applied. On the other hand, the magnitude response does not have to be flat in the pass-band. Indeed, it is more natural to aim for a magnitude response that changes smoothly with frequency without sharp transitions from a pass-band to a stop-band. Consequently, the standard filter design procedure, which aims to minimize a pass-band ripple and maximize a stop-band attenuation, is not entirely appropriate. In the case of a 15-coefficient low-pass Mth band filter that includes only the main lobe of the sin(x)/x function, a Kaiser window function with a shape parameter $\beta \approx 4.56$ is an example of a suitable choice of the low-pass Mth band filter.

When implementing the warped filter bank 50 based on the cosine modulation of the low-pass Mth band filter it is also possible to take advantage of some symmetries in the impulse responses. First of all, the elements in the warped delay line 14 can be combined in pairs since the filters in the warped filter block 16 have linear phase. Furthermore, it can be seen from FIG. 5 (left column) that the impulse transfer functions of the appropriate filters can be characterized as follows: $H_5(z)$ contains the same coefficients as $H_1(z)$ but with opposite sign on every second element, and this means that $H_5(z)=H_1(-z)$. Similarly, $H_4(z)=H_2(-z)$. In addition, some of the coefficients in $H_2(z)$, $H_3(z)$, and $H_4(z)$ are zero.

The output from the DRC/EQ module 20 can be calculated in one possible scenario by taking into consideration gain adjustments in the DRC/EQ block 18 with K DRC/EQ band blocks 18-1, 18-2, . . . , 18-K of FIG. 7 as follows $$Y(z)=g^T \cdot H(A(z;\lambda)) \cdot X(z) \quad (2),$$

wherein X(z) is the input (the signal 30), Y(z) is the output (the signal 34), g is a column vector of gains of the K DRC/EQ band blocks 18-1, 18-2, . . . , 18-K, respectively, and H(z) is a column vector containing the K WFIR filters (e.g., Mth warped filters) 16-1, 16-2, . . . , 16-K of the warped filter block 16 and $$g = \begin{bmatrix} g_1 \\ \vdots \\ g_K \end{bmatrix}, H(z) = \begin{bmatrix} H_1(z) \\ \vdots \\ H_K(z) \end{bmatrix}. \quad (3)$$

The delay $D_w$ (see the matched delay signal 40 in FIG. 1*a*) can depend on the warping factor λ and the number of elements N in the warped delay line and can be calculated as $$D_w = \frac{N-1}{2}\frac{1+\lambda}{1-\lambda} \quad (4)$$

In a special case when N=15 and λ=−0.75, we get $D_w=1$ as can be verified from the plot in the lower part of FIG. 4*b*. This means that when $f_s$=48 kHz the group delay is perfectly matched at the cross-over frequency 12 kHz by a single delay element $z^{-1}$ in the high-frequency branch. In the more general case where $D_w$ is not an integer, the matching delay is best implemented by a cascade of an integer delay $\lfloor D_w \rfloor$ and a fractional delay $D_w-\lfloor D_w \rfloor$. Techniques for implementing fractional delays are well known in the prior art.

However, the delay matching in the high-frequency branch of the two-channel QMF bank is not strictly necessary but if it is left out, the magnitude response will contain strong aliasing components near the cross-over frequency.

What is claimed is:

1. A warped processing module, comprising:

a warped delay line, responsive to a digital signal with a pre-selected sampling frequency, for providing N+1 warped delay line signals $W_0, W_1, \ldots W_N$ with a predetermined or a variable warping factor λ determining a non-linear frequency scale factor for defining a plurality of non-linearly-scaled frequency bands within a frequency range corresponding to a half of said pre-selected sampling frequency, wherein N is an integer of at least a value of one;

a warped filter block, responsive to said N+1 warped delay line signals $W_0, W_1, \ldots W_N$, configured to provide a warped filter block output signal based on warped spectral filtering of said N+1 warped delay line signals $W_0, W_1, \ldots W_N$ in said plurality of said non-linearly-scaled frequency bands, wherein a signal gain for each of the non-linearly-scaled frequency bands is set independently; and a dynamic range control/equalization block, responsive to said warped filter block output signal, configured to provide a dynamic range control/equalization output signal for providing a dynamic range control, an equalization, or both, said dynamic range control and said equalization of said digital signal based on said warped filter block output signal;

said warped processing module being embedded between analysis and synthesis filter blocks referred to as a filter bank; and wherein said analysis filter block is responsive to an audio input signal with a sampling frequency $f_s$ and in a frequency range from 0 to $f_s/2$, and said analysis filter block is configured to provide said digital signal with a reduced sampling frequency $f_{sr}=f_s/P$ which is equal to the pre-selected sampling frequency and in a low frequency branch, and to provide at least one complementary digital signal with the reduced sampling frequency $f_{sr}=f_s/P$ and in a high frequency branch, wherein P>1.

2. The warped processing module of claim 1, wherein said non-linearly-scaled frequency bands are defined on an approximately logarithmic frequency scale.

3. The warped processing module of claim 1, wherein said dynamic range control/equalization block contains K dynamic range control/equalization band blocks and each of said K dynamic range control/equalization band blocks is responsive to a corresponding one of said K band output signals and is configured to provide the dynamic range control, the equalization or both the dynamic range control and the equalization of said corresponding one of said K band output signals, and wherein each of said K dynamic range control/equalization band blocks is configured to provide a corresponding dynamic range control/equalization band output signal and said dynamic range control/equalization output signal comprises said K dynamic range control/equalization band output signal.

4. The warped processing module of claim 1, wherein said filter synthesis block is responsive to the dynamic range control/equalization output signal with the reduced sampling frequency $f_{sr}=f_s/P$ and to said at least one complementary output signal with the reduced sampling frequency $f_{sr}=f_s/P$ and configured to provide a digital audio output signal with the sampling frequency $f_s$ in the corresponding frequency range from 0 to $f_s/2$.

5. The warped processing module of claim 4, wherein P=2 and wherein said filter analysis block is a two-channel quadrature mirror filter analysis block, said filter synthesis block is a two-channel quadrature mirror filter synthesis block, said at least one complementary input signal is a complementary input signal, said at least one complementary output signal is a complementary output signal, said low frequency branch is in a frequency range from 0 to $f_s/4$, said high frequency branch is in the frequency range from $f_s/4$ to $f_s/2$, and the filter bank is a two-channel quadrature mirror filter bank.

6. The warped processing module of claim 5, wherein the warped processing block is responsive to the digital signal and the warped processing said dynamic range control/equalization output signal using warped processing in said low frequency branch.

7. The warped processing module of claim 6, wherein said complementary digital signal is provided to a complementary module and the complementary module block is configured to generate said complementary output signal in said high frequency branch to match the processing in the low and the high frequency branches at a cross-over frequency $f_s/4$ which separates the low and the high frequency branches.

8. The warped processing module of claim 7, wherein said complementary module comprises:

a matching delay module, responsive to the complementary digital signal, configured to provide a matched delay signal to match a frequency-dependent delay of the low frequency branch due to said warped spectral filtering by the warped filter block at the cross-over frequency $f_s/4$; and a variable gain block, responsive to said matched delay signal and to a high-band gain signal, configured to provide the complementary output signal to match a frequency-dependent gain of the low frequency branch due to said warped spectral filtering by the warped filter block at the cross-over frequency $f_s/4$.

9. The warped processing module of claim 8, wherein said high-band gain signal is a gain of a highest band of the plurality of said non-linearly-scaled frequency bands processed by the warped processing module and the dynamic range control/equalization block is configured to provide said high-band gain signal.

10. The warped processing module of claim 1, wherein said warped processing module is contained in one of a portable electronic device, an electronic communication device, a mobile electronic device or a mobile phone.

11. A method, comprising:

providing N+1 warped delay line signals $W_0, W_1, \ldots W_N$ with a predetermined or a variable warping factor $\lambda$ determining a non-linear frequency scale factor for defining a plurality of non-linearly-scaled frequency bands within a frequency range corresponding to a half of said pre-selected sampling frequency, said N+1 warped delay line signals $W_0, W_1, \ldots W_N$ are provided by a warped delay line of a warped processing module in response to a digital signal with a pre-selected sampling frequency;

providing a warped filter block output signal based on warped processing of said N+1 warped delay line signals $W_0, W_1, \ldots W_N$ in said plurality of said non-linearly-scaled frequency bands by a warped filter block of said warped processing module in response to said N+1 warped delay line signals $W_0, W_1, \ldots W_N$, wherein a signal gain for each of the non-linearly-scaled frequency bands is set independently; and providing a dynamic range control/equalization output signal in response to said warped filter block output signal by a dynamic range control/equalization block of said warped processing module for providing a dynamic range control, an equalization, or both said dynamic range control and said equalization of said digital signal, wherein said warped processing module is embedded between analysis and synthesis filter blocks referred to as a filter bank; and wherein said analysis filter block is responsive to an audio input signal with a sampling frequency $f_s$ and in a frequency range from 0 to $f_s/2$, and said analysis filter block is configured to provide said digital signal with a reduced sampling frequency $f_{sr}=f_s/P$ which is equal to the pre-selected sampling frequency and in a low frequency branch, and to provide at least one complementary digital signal with the reduced sampling frequency $f_{sr}=f_s/P$ and in a high frequency branch, wherein P>1.

12. The method of claim 11, wherein said non-linearly-scaled frequency bands are defined on a logarithmic frequency scale.

13. The method of claim 11, wherein said dynamic range control/equalization block contains K dynamic range control/equalization band blocks and each of said K dynamic range control/equalization band blocks is responsive to a corresponding one of said K band output signals and configured to provide the dynamic range control, the equalization or both the dynamic range control and the equalization of said corresponding one of said K band output signals, and wherein each of said K dynamic range control/equalization band blocks is configured to provide a corresponding dynamic range control/equalization band output signal and said dynamic range control/equalization output signal comprises said K dynamic range control/equalization band output signal.

14. The method of claim 11, wherein before providing N+1 warped delay line signals $W_0, W_1, \ldots W_N$, the method comprises:

providing by said two-channel quadrature mirror filter analysis block the digital signal with a reduced sampling frequency $f_{sr}=f_s/2$, which is equal to the preselected sampling frequency, and in a corresponding low frequency branch with a frequency range from 0 to $f_s/2$ in response to an audio input signal with a sampling frequency $f_s$ and in a corresponding frequency range from 0 to $f_s/2$ and providing a complementary digital signal with the reduced sampling frequency $f_{sr}=f_s/2$ in a corresponding high frequency branch with the frequency range from $f_s/4$ to $f_s/2$ to a complementary module.

15. The method of claim 14, further comprising:

generating a complementary output signal in said high frequency branch by the complementary module to match processing in the low and the high frequency branches at a cross-over frequency $f_s/4$ which separates the low and the high frequency branches in response to said complementary digital signal and providing said complementary output signal to the two-channel quadrature mirror synthesis block;

providing to the two-channel quadrature mirror synthesis block said dynamic range control/equalization output signal with the reduced sampling frequency $f_{sr}=f_s/2$ generated by warped processing of the digital signal by the warped processing module; and providing a digital audio output signal with the sampling frequency $f_s$ and the corresponding frequency range from 0 to $f_s/2$ by the two-channel quadrature mirror synthesis block in response to said dynamic range control/equalization output signal and to said complementary output signal.

16. The method of claim 15, wherein said generating a complementary output signal comprises:

providing a matched delay signal to match a frequency-dependent delay of the low frequency branch due to said warped spectral filtering by the warped filter block at the cross-over frequency $f_s/4$ by a matching delay module of said complementary module in response to said complementary digital signal;

providing a high-band gain signal, which is a gain of a highest band of the plurality of said non-linearly-scaled frequency bands processed by the warped processing module, to a variable gain block of the complementary module by the a dynamic range control/equalization block; and providing the complementary output signal by the variable gain block in response to said matched delay signal and to a high-band gain signal.

* * * * *